United States Patent
Thiessen et al.

(10) Patent No.: US 10,094,476 B2
(45) Date of Patent: Oct. 9, 2018

(54) VALVE DISK

(71) Applicant: VAG—Armaturen GmbH, Mannheim (DE)

(72) Inventors: Peter Thiessen, Bobenheim-Roxheim (DE); Torsten Fabian Rupp, Schwetzingen (DE); Heribert Erich Herold, Mannheim (DE); Carl Schulz, New Berlin, WI (US)

(73) Assignee: VAG—ARMATUREN, Mannheim (DE)

( * ) Notice: Subject to any disclaimer, the term of this patent is extended or adjusted under 35 U.S.C. 154(b) by 64 days.

(21) Appl. No.: 15/257,196

(22) Filed: Sep. 6, 2016

(65) Prior Publication Data

US 2017/0067562 A1 Mar. 9, 2017

(30) Foreign Application Priority Data

Sep. 8, 2015 (DE) .......................... 10 2015 115 033

(51) Int. Cl.
*F16K 1/22* (2006.01)
*F16K 1/36* (2006.01)

(52) U.S. Cl.
CPC ................ *F16K 1/222* (2013.01); *F16K 1/36* (2013.01)

(58) Field of Classification Search
CPC ... F16K 1/222; F16K 1/22; F16K 1/36; F16K 1/2014

USPC .................................................. 251/305, 308
See application file for complete search history.

(56) References Cited

U.S. PATENT DOCUMENTS

| 6,202,983 B1 | 3/2001 | Hartman et al. |
| 8,356,795 B2 * | 1/2013 | Schade .................. F16K 1/225 251/214 |
| 9,057,445 B2 | 6/2015 | Sisk |

FOREIGN PATENT DOCUMENTS

| DE | 10 2013 010 123 | 12/2014 |
| EP | 1 947 312 | 7/2008 |

OTHER PUBLICATIONS

Result of examination report for German Patent Application No. 10 2015 115 033.6 filed Sep. 8, 2015.

* cited by examiner

*Primary Examiner* — Marina Tietjen
(74) *Attorney, Agent, or Firm* — Paul D. Bianco; Katharine Davis; Fleit Gibbons Gutman Bongini & Bianco PL

(57) ABSTRACT

A valve disk with a disk-like valve body, which has a front with two protruding hubs and a back opposite the front. In order to permit improved flow around the valve disk and reduction of eddies on the outflow side, arc-like recesses running along an inside surface of both hubs are arranged on the front of valve body to deflect the flow around hubs.

19 Claims, 3 Drawing Sheets

VALVE DISK

FIELD OF THE DISCLOSURE

The disclosure relates to a valve disk for a shutoff valve.

BACKGROUND

Shutoff valves are widely used shutoff devices for water economy. In contrast to sluice gates, valves are very compact and, for nominal widths greater than DN 300, require much less installation space. Pipeline systems with nominal widths from about DN 300 are, therefore, generally equipped with shutoff valves. The drawback of shutoff valves is that the valve disk, mounted to rotate within a housing, is situated directly in the flow. Since the valve disk must withstand the pressure difference of the system in the closed position, the valve disks are designed correspondingly thick, especially for high pressure differences. However, the thicker the valve disk is dimensioned, the more flow resistance it creates relative to the medium.

In previously known valve disks with two opposite hubs, there is the additional problem that the hubs present in the flow can generate a wake space, depending on the shape and width of the hubs, which causes eddies in the flow region on the outflow side. On the one hand, these eddies can increase the wake space and, therefore, increase the total resistance of the shutoff valve and, on the other hand, form eddy fields, which lead to excitation of vibration of the shutoff valve or the downstream pipeline.

SUMMARY OF THE DISCLOSURE

Certain embodiments of the disclosure devise a valve disk of the type just mentioned, which permits improved flow and a reduction of turbulence on the outflow side.

Expedient embodiments and advantageous modifications of the such a valve disk are also disclosed.

According to the disclosure, arc-like recesses running along an inside surface of the two hubs are provided in the valve disk on the front of the disk-like valve body provided with two protruding hubs, in order to deflect the flow around the hubs. Eddy formation behind the hubs can be reduced on this account.

The recesses running along the hubs are expediently separated from each other by a center ridge. Indentations arranged in the center ridge between the recesses and running from the edge to the center of the valve body can be provided for further flow optimization and for weight reduction. The recesses and the preferably V-shaped indentations are expediently arranged so that, in a top view, the valve body has an X-shaped contour on the front between the two hubs. This contour contributes to flow optimization and also to stiffening.

The back of the valve body in a further advantageous embodiment is also contoured and has bent ribs. The ribs preferably lie opposite the recesses on the front and permit high rigidity with simultaneous weight saving in conjunction with the contour provided on the front of the valve body. If strength requires a change here, the ribs can also be displaced inward or outward relative to the recesses.

The hubs are advantageously designed to be streamlined and can have convex inside surfaces facing each other. In a particularly favorable variant with respect to flow, the hubs can have an elliptical or biconvex cross section and can also contain convex outer surfaces in addition to the convex inside surfaces facing each other.

In another expedient manner, passages can be arranged running through the hubs. Because of these passages on both hubs, pressure compensation between the center of the valve disk and the wake space behind the hubs can be achieved, and a partial vacuum and eddy formation on the outflow side of the valve disk can, therefore, be reduced. The activation moments for opening and closing the valve disk can also be reduced, and the hazard of vibrations of the shutoff valve and the downstream pipeline can be lessened.

With particular advantage, the passages can run from the inside of the valve disk through the hubs to the outside of the valve disk. Part of the flow can be directed toward the outside of the valve to reduce eddy formation. The passages can be aligned in parallel, at right angles, or at a different angle to the axis of rotation of the shutoff device and, therefore, arranged across the main direction of flow or at an angle to it. When several passages are present in each hub, the passages can be aligned differently or identically.

The passages can be expediently designed in the form of holes or slits. However, they can also have another appropriate shapes.

BRIEF DESCRIPTION OF THE DRAWINGS

Additional details and advantages of the disclosure are apparent from the following description and preferred practical examples with reference to the drawing. In the drawing.

DETAILED DESCRIPTION

Figure 1:
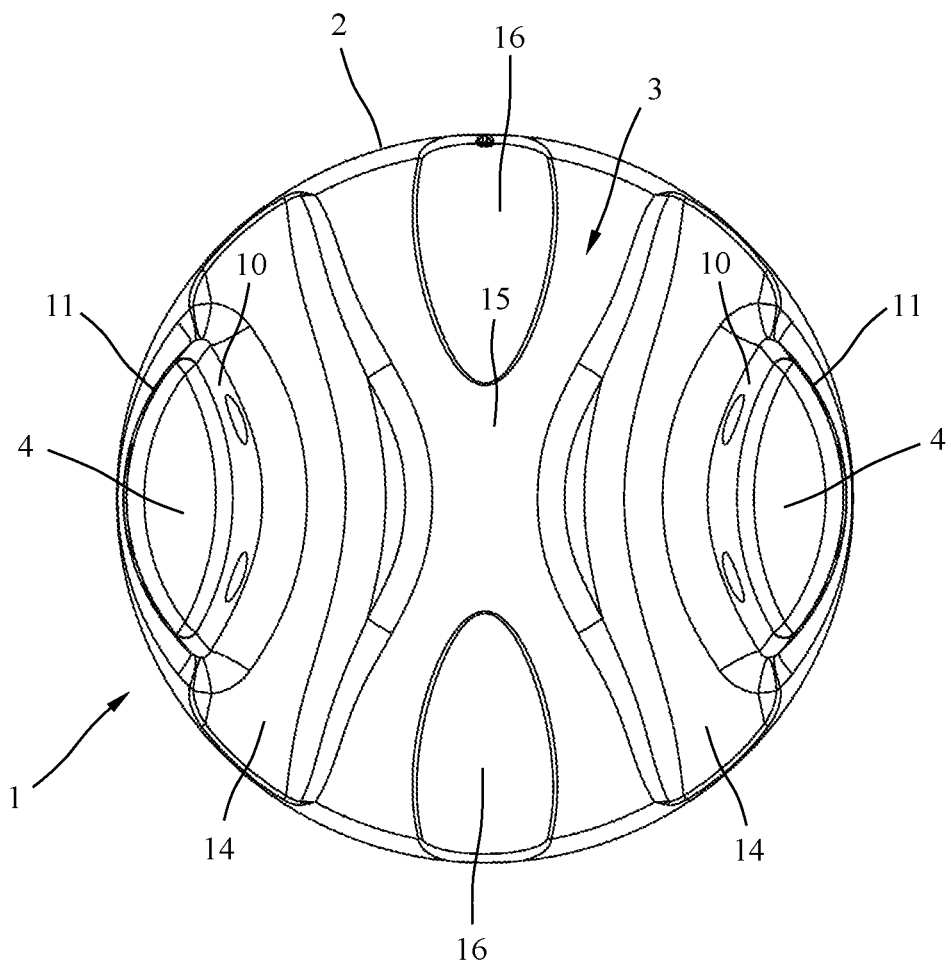
FIG. 1 shows a valve disk of a shutoff fitting in a top view.
Figure 2:
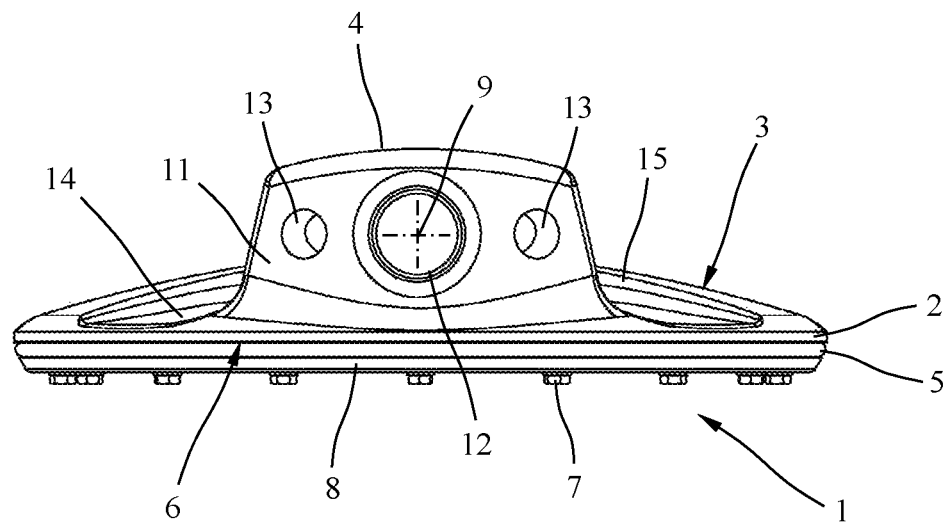
FIG. 2 shows the valve disk of FIG. 1 in a side view.

A valve disk 1 of a shutoff fitting is shown in FIGS. 1 and 2 in a top view and side view. The depicted valve disk 1 contains a disk-like valve body 2, which has two outside hubs 4 opposite each other and protruding relative to the front 3 of the valve body 2. The valve disk 1 also includes an annular or disk-like seal 5, apparent in FIG. 2, and a securing ring 8 releasably fastened to the back 6 of valve body 2 by means of screws 7, through which the seal 5 is fastened to the valve body 2. The valve body 2 of the valve disk 1 is mounted to pivot around an axis of rotation 9 running perpendicular to the center axis of the passage opening in known fashion within a housing provided with a round passage opening.

As follows from FIG. 1, the valve body 2 on a front 3 arranged between hubs 4 has a contour further described below to deflect the flow around the hubs 4. A special contour for flow deflection and stiffening is also provided on the back 6 of the valve body 2 depicted in FIG. 3.

Figure 4:
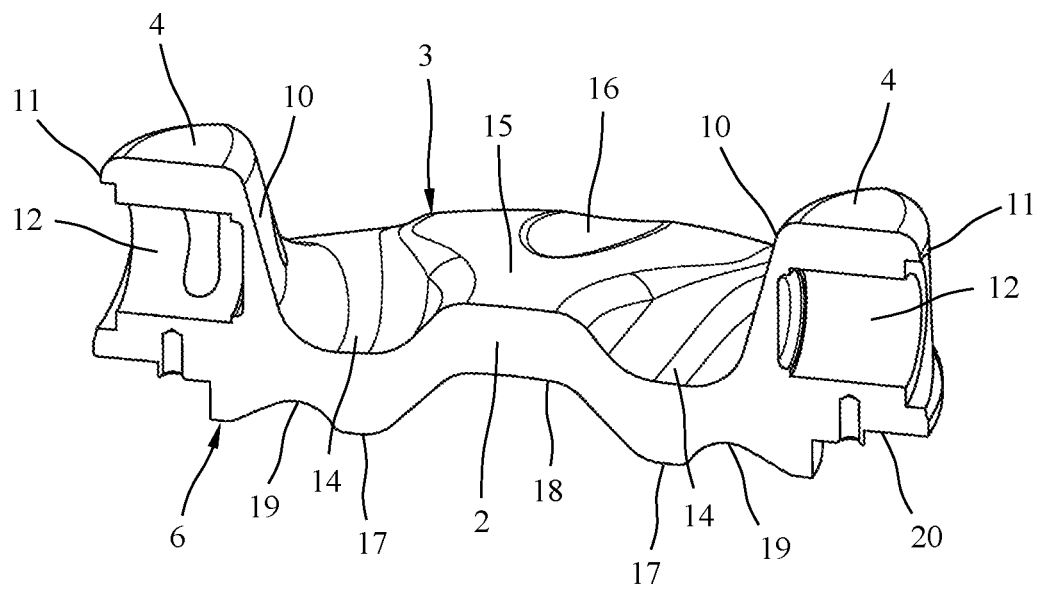
FIG. 4 shows the valve body of the valve disk depicted in FIG. 1 in cross section along the axis of rotation.
Figure 5:
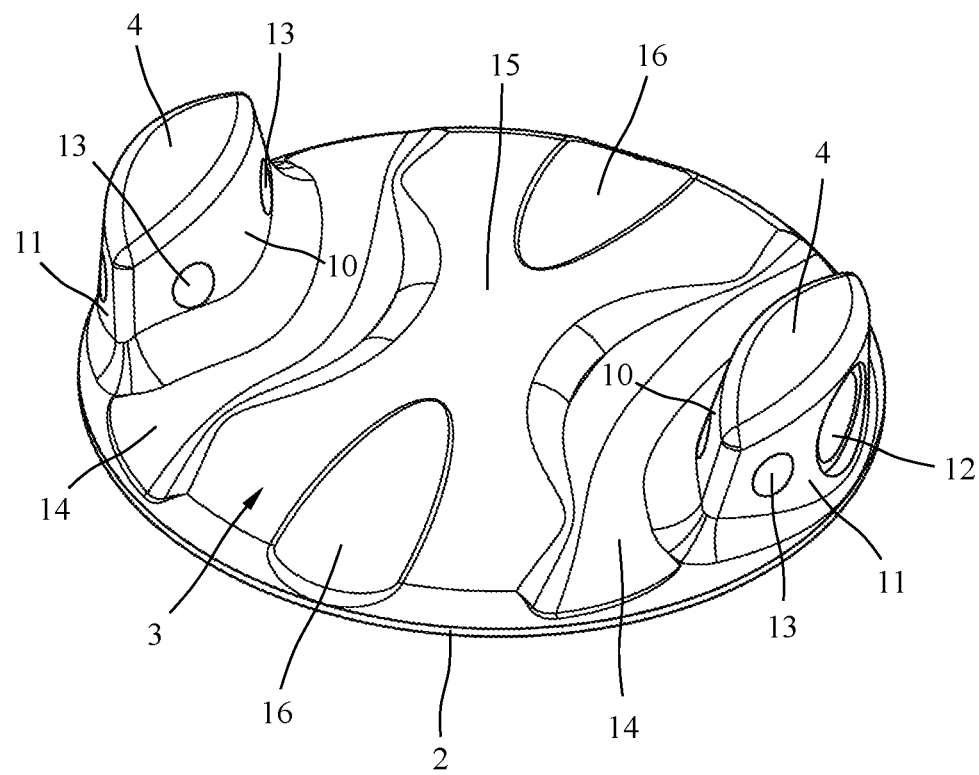
FIG. 5 shows the valve body of the valve disk depicted in FIG. 1 in a perspective view; and,
FIG. 6 shows the valve disk of FIG. 1 in a section at right angles to the axis of rotation.

It is apparent in FIGS. 1 and 5 that the hubs 4 protruding relative to the front 3 of the valve body 2 have convex inside surfaces 10 facing each other. In the depicted embodiment, the hubs 4 have an elliptical or biconvex cross section and also contain convex outer surfaces 11 in addition to the convex inner surfaces 10 facing each other. A side opening 12 to accommodate a bearing pin (apparent in FIG. 4) is provided in the two hubs 4.

In addition to openings 12, the hubs 4 have passages 13 running through them. Via the passages 13 in the two hubs 4, part of the fluid flowing along them in the open position of the valve disk 1 can be guided to the outside of the valve and pressure compensation achieved on this account between the center of the valve disk 1 and the wake space behind hubs 4. In this way, partial vacuum and eddy formation on the outflow side of valve disk 1 can be reduced. In addition, the activation moments for opening and closing valve disk 1 can be reduced, and the hazard of vibrations of the valve disk 1 and the downstream pipeline can be lessened.

In the depicted embodiment, the passages 13 are holes, which run obliquely to the axis of rotation 9. The passages 13, however, can also be slits and run parallel or perpendicular to the axis of rotation 9. The passages 13 can also have the same cross section or different cross sections, and be aligned identically or differently.

It is readily apparent from FIG. 5 that two arc-like recesses 14 running along the two inside surfaces 10 of hubs 4 are arranged on the front 3 of the valve body 2 in order to deflect the flow around the hubs 4. The two groove-like recesses 14 with U-shaped cross sections are separated from each other by a convexly arched center ridge 15 that widens on both sides to the outside from the center of valve body 2. Because of the two arc-like recesses 14 flow channels are formed between the two hubs 4, through which the flow is diverted around the hubs 4. Two diametrically opposite V-shaped (in a top view) indentations 16 are provided in the center ridge 15, which run from the edge to the center of the valve body 2. Because of this, the valve body 2 has an X-shaped contour in the top view on the front between the two hubs 4. This contour contributes to flow optimization and also to stiffening.

Figure 3:
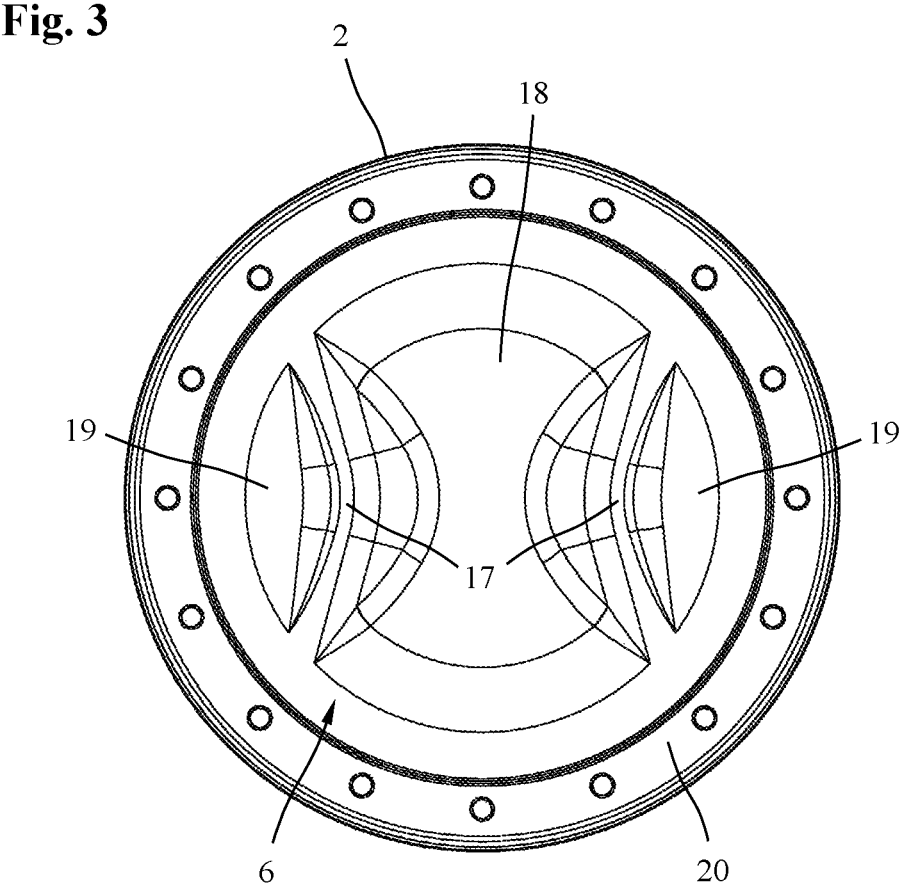
FIG. 3 shows a valve body of the valve disk depicted in FIG. 1 in a bottom view.

On the back 6, shown in FIG. 3, the valve body 2 also has a special contour with bent ribs 17, a depression 18 arranged between the ribs 17, and depressions 19 on the back arranged between the ribs 17 and the outside of the valve body 2. The ribs 17 lie opposite the recesses 14 on the front 3, whereas the depression 18 is opposite the center ridge 15 arranged on the front. The depression 18 has a width that increases from the center to both sides. Because of this, the valve body 2 contains a W-shaped cross-sectional surface, recognizable in FIG. 4, in a cross section running along its axis of rotation 9 through the two hubs 4. An annular recess 20 is also provided on the back of the valve body 2 to accommodate the seal 5 and the securing ring 8.

Figure 6:
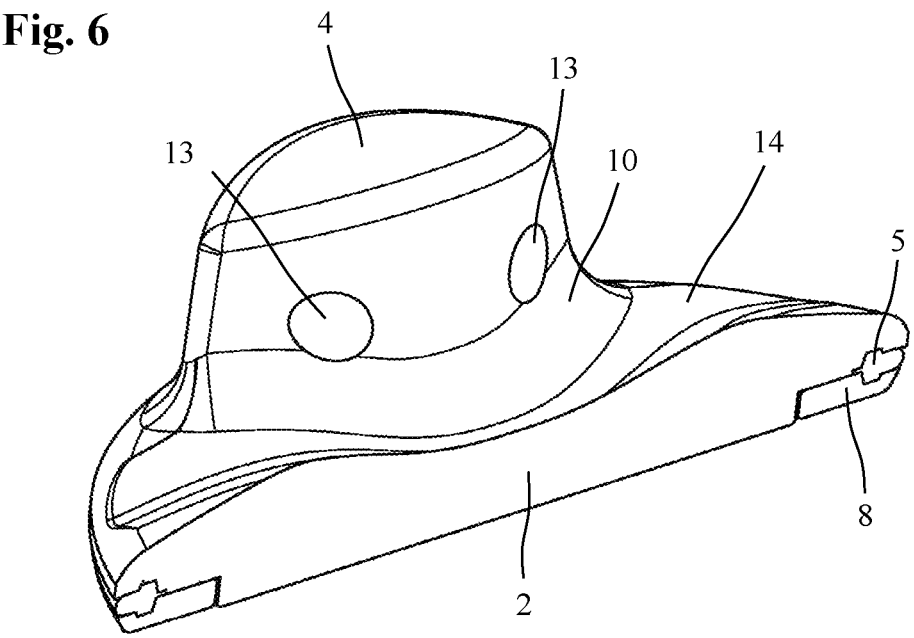

It is apparent in FIG. 6 that the arc-like recesses 14 running along both inside surfaces 10 of hubs 4 have a depth that increases from the two edges of the valve body 2 toward the center. The depth of the recesses 14 increases from the edges of the valve body 2 to the hub. The recesses 14 have the greatest depth in the center of hub 4.

What is claimed is:

1. A valve disk comprising:
    a valve body shaped as a disk, the valve body having a front and a back opposite the front;
    two hubs protruding from opposing sides of the front of the valve body; each hub of the two hubs having a recess shaped as an arc running along an inside surface, the recesses configured to deflect flow around the two hubs; and
    indentations positioned between the recesses, each indentation running from an edge of the valve body to a center of the valve body,
    wherein the recesses and the indentations are arranged such that the valve body has a contour shaped as an X in a top view of the valve disk between the two hubs.

2. The valve disk according to claim 1, further comprising a center ridge separating the recesses.

3. The valve disk according to claim 1, wherein each recess has a depth increasing from edges of the valve body toward the center of the valve body.

4. The valve disk according to claim 1, wherein the valve body has a cross section shaped as a W, the cross section extending along an axis of rotation though the two hubs.

5. The valve disk according to claim 1, wherein the inside surface of each hub of the two hubs is convex.

6. The valve disk according to claim 5, wherein each hub of the two hubs has an elliptical cross section or a biconvex cross section.

7. The valve disk according to claim 5, wherein each hub of the two hubs further comprises a convex outer surface.

8. The valve disk according to claim 1, wherein the two hubs further comprise passages, each of the two hubs having at least one passage running therethrough.

9. The valve disk according to claim 8, wherein the passages are formed as holes.

10. The valve disk according to claim 8, wherein the passages run from an interior of the valve disk, through the hubs, to an exterior of the valve disk.

11. The valve disk according to claim 8, wherein the passages are aligned in parallel, at right angles, or at angles to an axis of rotation of the valve disk.

12. The valve disk according to claim 8, wherein each of the two hubs has multiple passages running therethrough.

13. The valve disk according to claim 12, wherein the passages are aligned identically or differently.

14. The valve disk according to claim 1, further comprising an annular seal and a securing ring releaseably fastened within an annular recess in the back of the valve body.

15. The valve disk according to claim 1, wherein each of the two hubs has an opening in a side surface configured to accommodate a bearing pin.

16. A valve disk comprising:
    a valve body shaped as a disk, the valve body having a front and a back opposite the front;
    two hubs protruding from opposing sides of the front of the valve body; each hub of the two hubs having a recess shaped as an arc running along an inside surface, the recesses configured to deflect flow around the two hubs;
    indentations positioned between the recesses, each indentation running from an edge of the valve body to a center of the valve body, and
    bent ribs arranged on the back of the valve body, the bent ribs opposite the recesses;
    wherein the recesses and the indentations are arranged such that the valve body has a contour shaped as an X in a top view of the valve disk between the two hubs.

17. The valve disk according to claim 16, further comprising depressions positioned between the bent ribs.

18. The valve disk according to claim 17, wherein each depression has a width that increases from a center to both sides.

19. The valve disk according to claim 16, wherein the bent ribs are configured to be displaced inward or outward relative to the recesses.

* * * * *

UNITED STATES PATENT AND TRADEMARK OFFICE
CERTIFICATE OF CORRECTION

PATENT NO. : 10,094,476 B2  
APPLICATION NO. : 15/257196  
DATED : October 9, 2018  
INVENTOR(S) : Peter Thiessen et al.

Page 1 of 1

It is certified that error appears in the above-identified patent and that said Letters Patent is hereby corrected as shown below:

On the Title Page

Below item (73) the name of the Assignee should read:  
(73) Assignee: VAG - ARMATUREN GMBH Signed and Sealed this  
Twenty-sixth Day of February, 2019

Andrei Iancu  
*Director of the United States Patent and Trademark Office*